Figure 1:
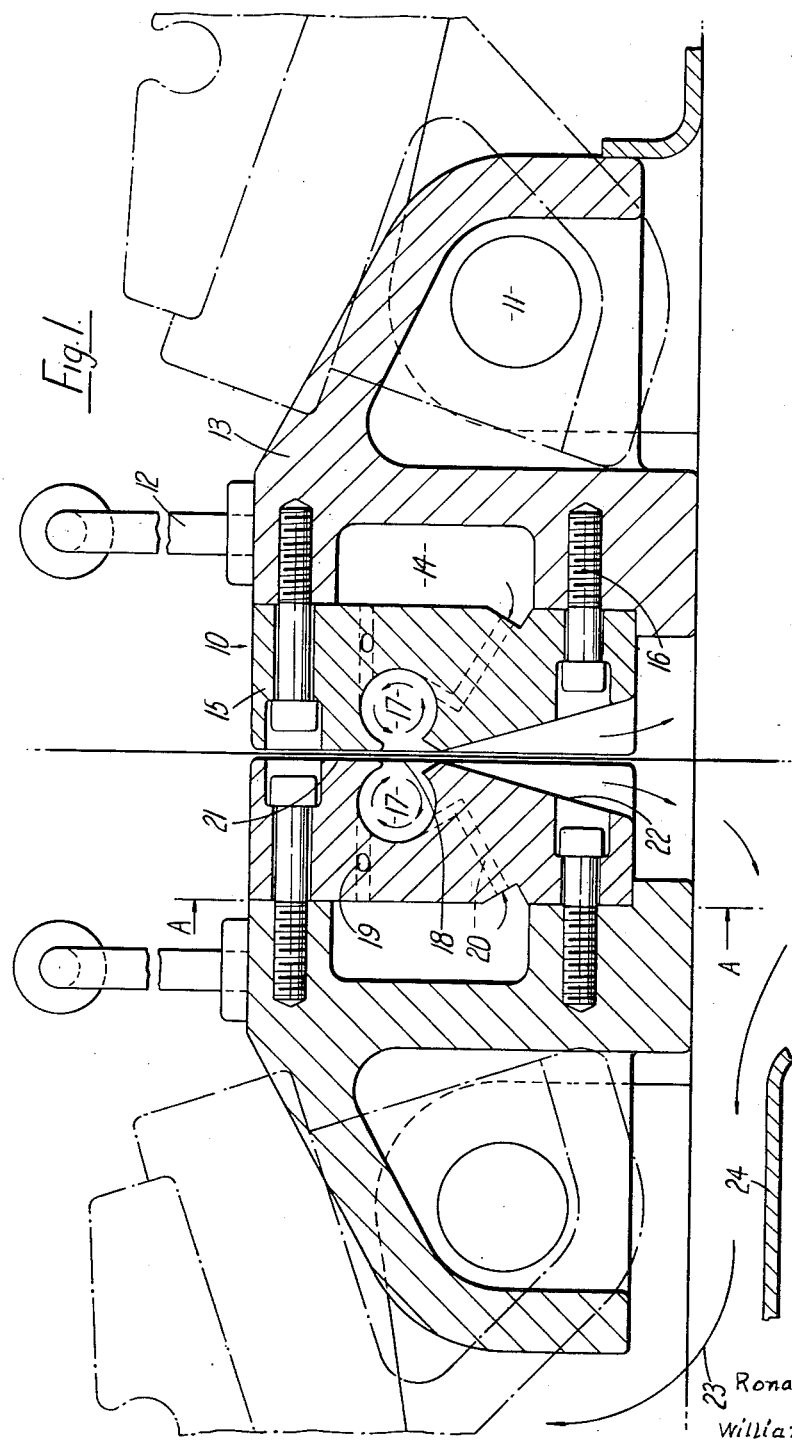

July 10, 1962 R. S. GOY ETAL 3,042,956
DEVICES FOR USE IN THE TREATMENT OF FABRICS
WITH A FLUIDISED SOLID AGENT
Filed March 22, 1961 2 Sheets-Sheet 2

Inventors
Ronald Stansfield Goy
William Douglas Bennett
By Stevens Davis Miller + Mosher Attorneys United States Patent Office 3,042,956
Patented July 10, 1962

3,042,956
DEVICES FOR USE IN THE TREATMENT OF FABRICS WITH A FLUIDISED SOLID AGENT
Ronald Stansfield Goy and William Douglas Bennett, Erdington, Birmingham, England, assignors to Dunlop Rubber Company Limited, London, England, a British Company
Filed Mar. 22, 1961, Ser. No. 97,574
Claims priority, application Great Britain Apr. 8, 1960
8 Claims. (Cl. 15—306)

This invention relates to apparatus for use in treating textile materials in which the materials are heated by a fluidisation technique.

In application Serial No. 725,677, filed April 1, 1958, and now abandoned, we have described a form of machine which can be used for stretching nylon and other high polymer yarns in the form of a substantially weftless fabric, and in which the fabric is heated by a fluidised heating medium. Briefly, in this machine the fabric is drawn upwardly through a heating chamber provided with heating means and containing a fluidisable particulate material, e.g. sand or, more conveniently, the artificial material known as "Ballotini" consisting of minute glass balls. The particulate material is kept in the fluidised state by passing a strong upward current of air through the chamber.

It is found that when a fabric is treated, to stretch it or for some other purpose, in this machine a few of the particles of the fluidised material tend to stick to it, partly it is believed as a result of the formation of an electrostatic charge on the fabric during its passage in contact with the hot rapidly moving particles. It is an object of the present invention to provide means for removing adherent particles from the fabric, said means conveniently forming part of the said machine or of other machines for treating fabrics with a fluidised solid, especially machines in which the fabric leaves the treating space vertically or at an angle to the vertical.

The device, which is the subject of the invention and by means of which this object is achieved, comprises a pair of jaws running across the width of the machine and adapted to bear lightly, in their working position, on a fabric passing between them out of the heating chamber, each of the said jaws being provided with a longitudinal cavity, preferably of cylindrical shape, in which an axial vortex of air can be generated, opening over a minor portion of its circumference at the surface of the jaw, and with air passages opening substantially tangentially into each cavity and adapted to generate a vortex of air in the cavity and substantially coaxially therewith in a direction such that at the opening of the cavity the air is moving in the direction opposite to the direction of travel of the fabric, the surfaces of the jaws below the entrance to the cavity diverging downwardly when the jaws are in their working position. Above the cavity the faces are preferably parallel, at least over part of their height. The cavities are preferably closed at their ends, so as to prevent the escape into the ambient atmosphere of any substantial amount of the air supplied from the air channels.

Preferably the axes of the air channels are parallel and inclined with respect to the longitudinal axes of the cavities, so that the air vortex produced thereby has a linear velocity component along the said axis. It is advantageous that this velocity component should be in the same direction in both jaws, i.e. either to the right or to the left of the machine seen as a whole.

In order to provide easy access to the interior of the machine and to facilitate threading up, the jaws are advantageously mounted on pivots, preferably in such a way that they can be swung up and away from each other. They can then be kept in their working position by their own weight, the balance about the pivots being so chosen or adjusted that the upper surfaces of the jaws make sliding contact with the fabric without gripping it tightly. Below the openings of the cavities it is preferable that at their closest the jaws should be spaced apart sufficiently to allow some lateral movement of the fabric (i.e. movement in a plane perpendicular to that of the fabric) and also the escape of air from the cavities into the space below the device, e.g. by ½ inch or less, and especially by ¼ inch or less. It will be understood that this relationship necessarily involves the surfaces of the jaws being more widely spaced apart immediately below the openings of the cavities than above them.

The air channels are preferably arranged in two or more series in each cavity, opening along different lines each parallel to the longitudinal axis of the cavity, so as to aid in producing a high speed and uniform vortical air flow along the length of the cavity. Advantageously the openings in the different lines are staggered, at least to some extent. At least the openings of the channels into the cavity should be small enough to generate the high air velocity required to cause the formation of the vortex.

It is found that, by feeding air to the air channels under a suitably high pressure, which will of course vary to some extent with the dimensions of the device and the operating conditions, not only can a vigorous blowing action be exerted on the fabric, but also the fabric can be caused to vibrate or oscillate violently, in a direction perpendicular to the plane of the fabric, in the inverted V-shaped space formed by the diverging lower part of the jaws. This vibration greatly reinforces the simple blowing effect in removing adherent particles from the fabric. Moreover, the blast of air can be employed simultaneously to cool the fabric; thus by using air at about room temperature (which will be further cooled by expansion on leaving the air channels) it is possible to cool the fabric by about 60° C. or even more before it finally leaves the machine. Electro-static charges on the fabric, e.g. resulting from friction with the fluidised heating particles, are discharged by the contact of the fabric with the jaws, so still further aiding in the removal of particles from it.

Figure 2:
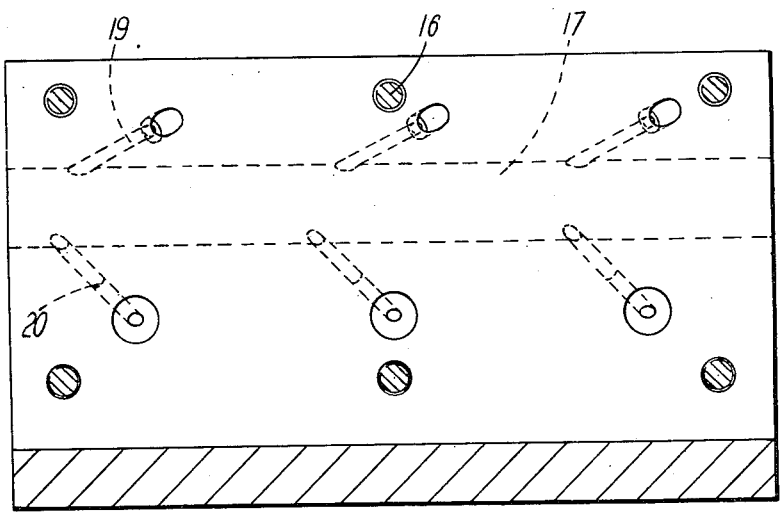

The invention is illustrated in the accompanying drawing, in which:

FIGURE 1 is a sectional view taken from near one end of the device, with the jaws in their operating position, and FIGURE 2 is a sectional view of one of the jaws taken on the line A—A in FIGURE 1.

Referring now to the drawing, the device comprises the two jaws indicated generally by 10, which are mounted on pivots 11 and provided with handles 12. (The dotted lines show the jaws in the "open," i.e. non-working, position.)

Each jaw comprises a back portion 13, which is hinged on the pivot 11 and carries the handle 12 and which is provided with a chamber 14 communicating by means, not shown, with a source of compressed air. A front portion 15 is fixed securely to the back portion 13 by bolts 16, making an airtight joint therewith.

Along the front portion 15 of each jaw runs a cylindrical cavity 17, opening into the face of the jaw over a minor proportion of its circumference at 18; two sets of air channels 19, 20 open at one end into the chamber 14 and at the other tangentially into the cavity 17, being arranged to generate a clockwise vortex in the cavity in the left hand jaw (as seen in FIGURE 1) and an anti-clockwise vortex in the cavity in the right hand jaw. The channels of one set open into the top of the cavity, and those of the other into the bottom of the cavity, and the individual channels of the two sets are to some extent staggered. The channels run, immediately before opening into the cavity, at an angle of about 45° to the longitudinal axis of the cavity (as shown in FIGURE 2); the channels in the two jaws are arranged to point towards the same side of the machine, so that the vortices produced both have an axial velocity component in the same direction.

Above the openings of the cavities the faces 21 of the two jaws are parallel and, when the device is empty, rest in contact; below, the faces 22 are at an angle to the vertical and diverge, being narrowly spaced at their upper ends and more widely at their lower.

The device is shown in position on the top of a fluidisation-type heating chamber, vents 23 being left for the escape of the air used to effect the fluidisation and that injected by the device of the invention. A baffle 24 is preferably fixed below these vents to prevent or minimise the escape of particles of the fluidised material.

When a machine embodying the device of the invention is to be used for stretching nylon or other yarns in the form of a weftless or substantially weftless fabric, the fabric is positively fed to the machine at one speed and positively drawn from it at a higher speed, using, for example, driven nip rollers in the known way. The invention can, however, be applied generally to machines and processes in which a textile material is heated by a fluidisation technique, whether or not of the type described in our earlier specification; thus, it can for example be applied to the relaxation or heat-setting of, and the fixation of dyes on, fabrics of nylon or other synthetic polymers, such for example as polyethylene terephthalate or an acrylonitrile polymer, by methods known in themselves, and to the drying of these and other fabrics.

We claim:

1. A device for removing from a travelling fabric adherent particles derived from a fluidised solid treating agent, comprising a pair of jaws adapted to bear lightly, in their working position, on a fabric passing between them, each of the jaws being provided with a longitudinal cavity in which an axial vortex of air can be generated and which opens over a minor portion of its circumference at the surface of the jaw, and with air passages opening substantially tangentially into such cavity and adapted to create a vortex of air in the cavity and substantially co-axially therewith in a direction such that at the opening of the cavity the air is moving in the direction opposite to the direction of travel of the fabric, the surfaces of the jaws below the entrances to the cavities diverging downwardly when the jaws are in their working position.

2. A device according to claim 1, wherein the jaws are pivoted in such a way that they can be swung up and away from each other, and are kept in their working position by their own weight, the balance about the pivots being such that in their working position the upper surfaces of the jaws make sliding contact with a fabric passing between them.

3. A device according to claim 1, wherein the cavities are substantially cylindrical.

4. A device according to claim 1, wherein the cavities are closed at their ends.

5. A device according to claim 1, wherein the air passages are parallel and are inclined with respect to the longitudinal axes of the cavities, the inclination being in the same direction in both jaws.

6. A device according to claim 1, wherein in their working position the surfaces of the jaws immediately below the openings of the cavities are more widely spaced apart than above the said openings.

7. A device for removing from a travelling fabric adherent particles derived from a fluidised solid treating agent, which comprises a pair of jaws pivoted in such a way that they can be swung up and away from each other, and are kept in their working position by their own weight, the balance about the pivots being such that in their working position the upper surfaces of the jaws make sliding contact with a fabric passing between them, each of the jaws being provided with a substantially cylindrical longitudinal cavity which is closed at its ends but which opens over a minor portion of its circumference at the surface of the jaw, and with air passages opening susbtantially tangentially into such cavity, the said passages being parallel and inclined with respect to the longitudinal axes of the cavities in the same direction in both jaws, and being adapted to create a vortex of air in each cavity and substantially coaxial therewith in a direction such that at the opening of the cavity the air moves downwardly when the jaws are in their working position, the surfaces of the jaws below the entrances to the cavities diverging downwardly when the jaws are in their working position.

8. A device according to claim 7, wherein in their working position the surfaces of the jaws immediately below the openings of the cavities are more widely spaced apart above the said openings.

References Cited in the file of this patent

UNITED STATES PATENTS

| | | |
|---|---|---|
| 392,082 | Turner | Oct. 30, 1888 |
| 1,926,306 | Pettersen | Sept. 12, 1933 |
| 1,930,575 | Wynd et al. | Oct. 17, 1933 |
| 2,473,629 | Andrews | June 21, 1949 |
| 2,648,089 | Mayer | Aug. 11, 1953 |
| 2,967,119 | Gutterman | Jan. 3, 1961 |
| 2,971,267 | Berlyn | Feb. 14, 1961 |